(12) United States Patent
Stottlemyer et al.

(10) Patent No.: US 7,954,442 B2
(45) Date of Patent: Jun. 7, 2011

(54) TOWED ARRAY DEPLOYMENT SYSTEM FOR UNMANNED SURFACE VEHICLES

(75) Inventors: Thomas R. Stottlemyer, Noank, CT (US); Richard C. Mewer, Kittery, ME (US); Mark A. Maugle, Groton, CT (US)

(73) Assignee: The United States of America as represented by the Secertary of the Navy, Washington, DC (US)

( * ) Notice: Subject to any disclaimer, the term of this patent is extended or adjusted under 35 U.S.C. 154(b) by 196 days.

(21) Appl. No.: 12/454,494

(22) Filed: Apr. 30, 2009

(65) Prior Publication Data

US 2010/0275831 A1    Nov. 4, 2010

(51) Int. Cl.
*B63B 21/16* (2006.01)
(52) U.S. Cl. ..................................................... 114/254
(58) Field of Classification Search ................. 114/242, 114/243, 244, 249, 253, 254
See application file for complete search history.

(56) References Cited

U.S. PATENT DOCUMENTS

| | | | | |
|---|---|---|---|---|
| 3,961,589 A * | 6/1976 | Lombardi | ...................... | 114/328 |
| 5,119,751 A * | 6/1992 | Wood | ............................. | 114/242 |
| 5,967,076 A * | 10/1999 | Tinnen | ............................ | 114/254 |
| 7,206,256 B1 * | 4/2007 | Thornton et al. | ............. | 367/130 |
| 7,252,046 B1 * | 8/2007 | Ead et al. | ........................ | 114/254 |

\* cited by examiner

*Primary Examiner* — Daniel V Venne
(74) *Attorney, Agent, or Firm* — James M. Kasischke; Michael P. Stanley; Jean-Paul A. Nasser

(57) ABSTRACT

A towed array deployment system is provided that uses the flow of fluid through the interior of a tube to deploy a towed line array. The system includes a small surface water craft such as an unmanned surface vehicle having a length between seven and eleven meters and a U-shaped tube mounted to the outside of the hull of the watercraft below the waterline. A towed array is fed from a winch aboard the surface craft, through one end of the tube, and the fluid is introduced through into the interior of the tube to force the towed array for deployment through the tube and out a second end of the tube near the stern of the watercraft.

16 Claims, 2 Drawing Sheets

TOWED ARRAY DEPLOYMENT SYSTEM FOR UNMANNED SURFACE VEHICLES

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to a method and system for the deployment and retrieval of linear arrays off of Unmanned Surface Vehicles (USVs).

2) Description of Prior Art

Sonar systems are used to determine the direction of propagating underwater signals and hence the location of the source of these signals. Sonar systems utilize arrangements or arrays of sources and receivers to detect arriving signals and to determine the direction from which these signals originated. For example, appropriate time delays applied to the receivers serve to steer the array and to calculate the direction of arrival of the incoming signals.

Some such systems are known generally as towed arrays and are towed behind surface ships, submarines and Unmanned Undersea Vehicles (UUVs). Unmanned Surface Vehicles (USVs) are currently being developed to perform a variety of missions including deploying and retrieving linear acoustic arrays. USVs are relatively small craft with lengths ranging from approximately 7 to 11 meters.

Handling systems on USVs must fit within tight space and conform to weight limits. Current USV handling systems for towed systems (including linear arrays) store the towed array on the deck of the USV and utilize a mechanical over-boarding system to deploy the towed array. The over-boarding system includes a winch located on deck to handle the cable and some type of over-boarding mechanism to get the array in and out of the water. The mechanism also includes some type of traction winch or mechanism to pull the array off the winch drum and into the water for deployment.

Since the towed array is similar to a flexible rope that is constructed to be pulled, the towed array cannot be very easily pushed. Therefore, an ideal method of deploying a flexible array is to have the array pulled off the craft and into the water. Once a sufficient length of the array is in the water, the hydrodynamic drag of the array towed through the water, combined with the array and cable weight, will pull the remaining array and cable off the winch.

SUMMARY OF THE INVENTION

The present invention is directed to the, use of a submerged tube that is flushed with the fluid in which a watercraft is located (e.g., seawater). The fluid is propelled or forced through the tube, drawing the towed array through the interior of the tube and out an end of the tube.

The tube is attached to the small surface watercraft below the waterline in order that the tube, including the ends of the tube disposed adjacent the stern of the watercraft are submerged. One of these ends houses the aft portion of the towed array.

In one embodiment, the fluid is propelled through an open valve and the interior of the tube using the forward motion of the watercraft. The propelled fluid creates a pressure difference inside the tube between the valve and exit hole. The pressure difference forces water through the tube and the drag of water moving over the array will force the array to exit out the tube and begin deployment.

In another embodiment, a pump is used to propel the fluid though the interior of the tube. This embodiment is suitable for slow speed deployment (i.e., when the watercraft is traveling at a relatively slow speed or is stationary).

In accordance with one exemplary embodiment, the present invention is directed to a system that is used for towed array deployment. This system includes a small surface watercraft capable of defining a waterline along the hull of the watercraft. A tube is attached to the watercraft below this waterline. The tube includes two open ends and a fluid injection system disposed between the two open ends in order to introduce fluid into an interior of the tube.

A winch is attached to the watercraft preferably on the deck of the watercraft. The winch is disposed adjacent a first one of the two open ends of the tube. A tow cable and towed array are stored on the winch and extend from the winch through the first open end and at least partially through the interior of the tube. This arrangement facilitates deployment of the towed array by the fluid introduced into the interior by the fluid injection system to deploy from the winch, along the interior of the tube and out a second one of the two open ends.

A preferred shape of the tube is non-rectilinear so that both of the open ends of the tube are disposed adjacent a stern of the watercraft. In another embodiment, both of the open ends are disposed aft of the fluid injection system.

In yet another embodiment, the fluid injection system includes a pump having an intake in communication with a fluid and a discharge line in communication with the interior of the tube—adjacent the first end of the tube.

In still another embodiment, the fluid injection system includes at least one valve. This valve, when in an open position, permits passage of fluid into the interior of the tube. Preferably, the valve is disposed adjacent the bow of the watercraft.

In still another embodiment, the tube has a U-shape and is positioned with the ends of the U-shape corresponding to the open ends of the tube and disposed adjacent a stern of the watercraft. In this embodiment, the fluid injection system is a valve that permits passage of a fluid into the interior of the tube. This valve is disposed along a curved bottom of the U-shape and adjacent a bow of the watercraft.

The present invention is also directed to a method for deploying a towed array from a small surface watercraft. In accordance with this method, fluid is introduced into an interior of a tube disposed on a surface watercraft below the waterline of the watercraft. A portion of a towed array is disposed in the interior of the tube. The introduced fluid is used to draw the towed array through the interior of the tube and out one of two open ends of the tube that is disposed adjacent a stern of the watercraft.

In one embodiment, in order to introduce the fluid, a valve attached to the tube is opened to permit passage of the fluid into the interior. The motion of the watercraft is used to propel the fluid through the valve and along the interior of the tube. In an alternative embodiment, the fluid is introduced into the tube using a pump attached to the tube to propel the fluid into and along the interior of the tube.

In still another embodiment, the towed array is stored on a winch disposed on the watercraft. The towed array is fed from the winch through another of the two open ends of the tube and into the interior. Drawing the towed array through the interior of the tube deploys the towed array from the winch.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
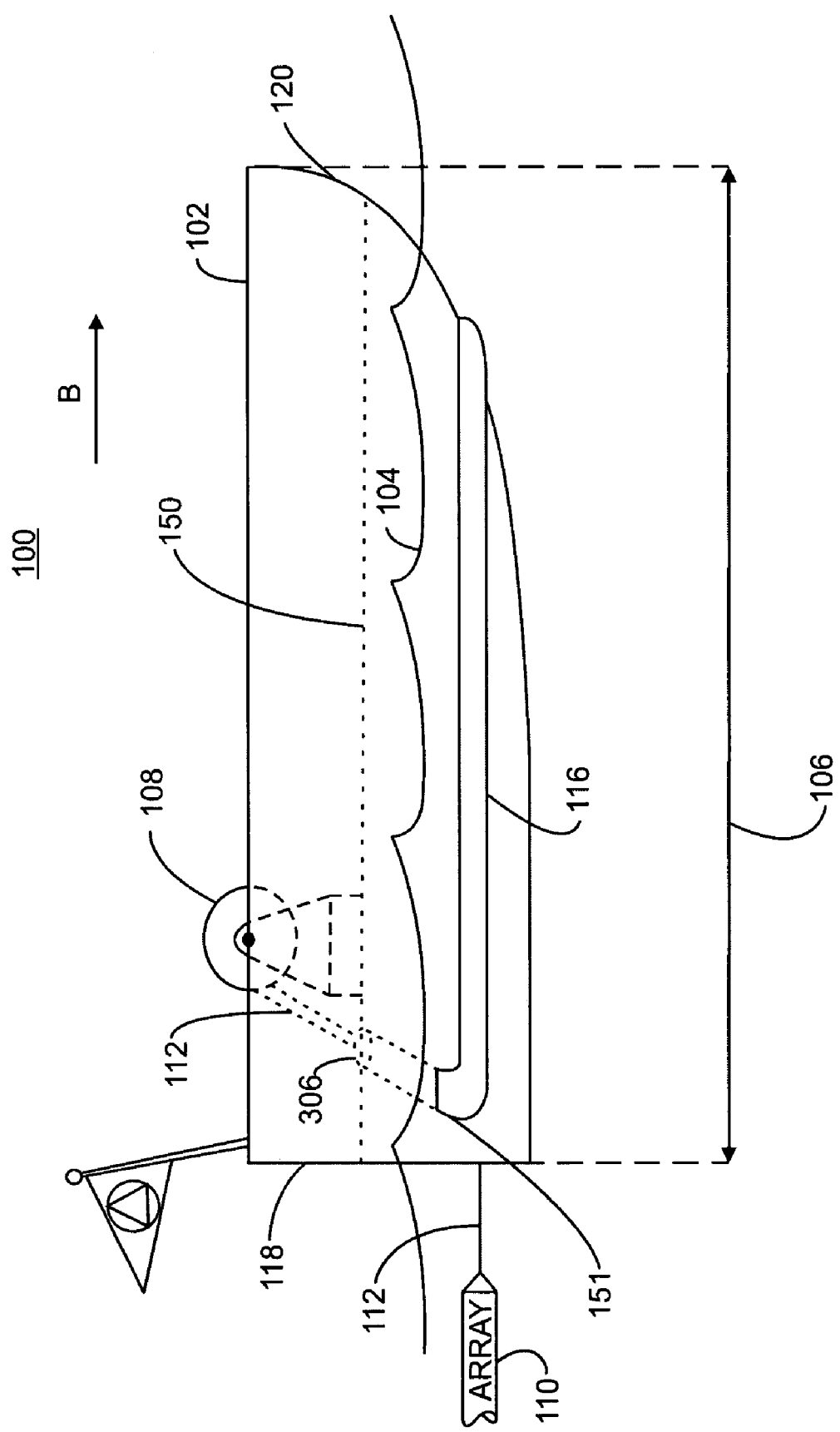
FIG. 1 is a schematic representation of an embodiment of a towed array deployment system in accordance with the present invention.

Referring initially to FIG. 1, an exemplary embodiment of a towed array deployment system 100 in accordance with the present invention is illustrated. The towed array deployment system includes a small surface watercraft 102 having a stern 118 and a bow 120. Suitable small surface watercraft include, but are not limited to Unmanned Surface Vehicles (USVs), manned vessels and semi-submersibles.

In general, the watercraft has an overall length 106 of less than 12 meters and preferably in the range of 7 meters to 11 meters. As used herein, the overall length of the watercraft, in feet or meters, is measured from the foremost part of the bow to the aftermost part of the stern, including any fixed projections extending beyond the bow and stern.

The watercraft 102, when either at rest or moving through the water includes a waterline 104 (representative of the fluid in which the watercraft floats). The towed array deployment system also includes an external tube 116 attached to the watercraft 102 below the waterline 104. A through hull access tube portion 151 can also be provided that passes through the hull of the watercraft 102 so that an end 306 of the tube is located on the deck 150 of the watercraft.

The tube 116 is a hollow tube having an interior that is sized to accommodate passage of a deployed towed array. Suitable materials for the tube are compatible with the environment and could include metals, composites and plastics. In the embodiment as illustrated, the length of the tube 116 ranges from approximately 0 meters to 20 meters, excluding any through-hull access tube portion 151. The tube 116 can be a separate structure that is mounted or fixed to the hull of the watercraft 102. Alternatively, the tube 116 can be integrated into the structure of the hull.

Figure 2:
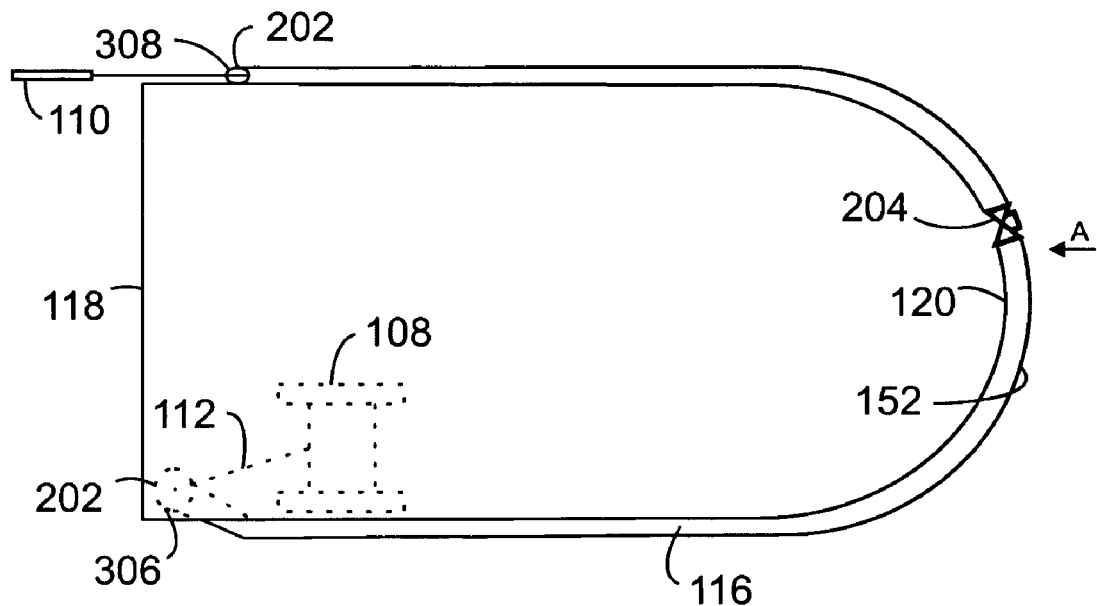
FIG. 2 is a schematic representation of another embodiment of the towed array deployment system.
Figure 3:
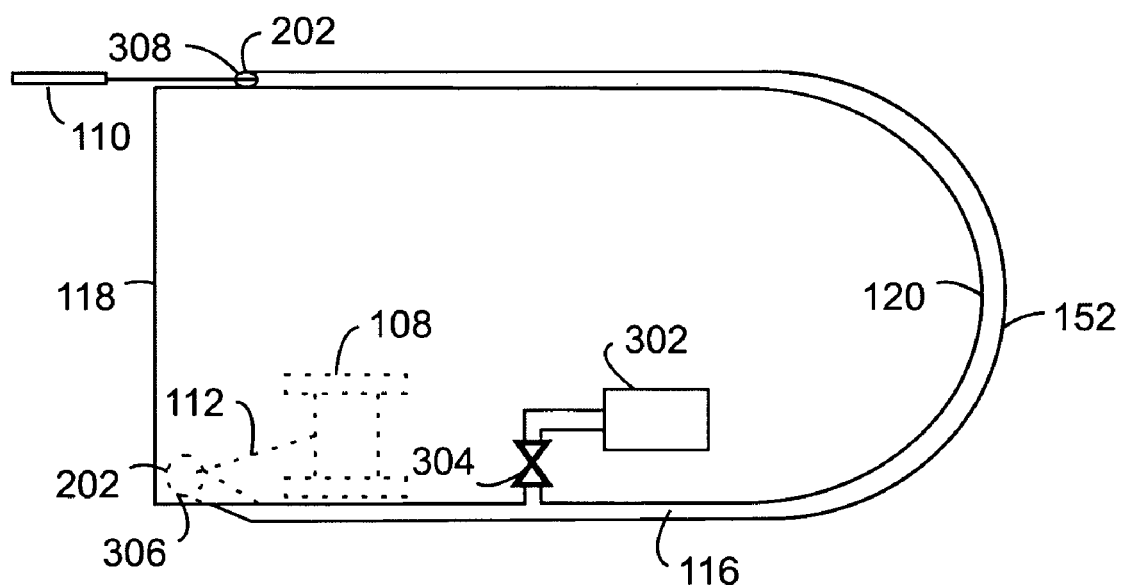
FIG. 3 is a schematic representation of yet another embodiment of the towed array deployment system.

Referring now to FIG. 2 and FIG. 3, the tube 116 includes two open ends 202. Although the tube can be straight, preferably the tube has a non-rectilinear shape. This non-rectilinear shape facilitates both of the open ends of the tube 116 being located adjacent the stern 118 of the watercraft 102. Therefore, the towed array 110 is deployed behind the watercraft 102 with the deployment aided by the motion of the watercraft. In addition, one open end 306 can be used to insert the towed array 110 into the interior of the tube 116, and the other open end 308 can be used to deploy the towed array. The top of the u-shape corresponds to the ends 202 of the tube 116. The bottom or rounded portion of the u-shape 152 is located adjacent to or around the bow 120 of the watercraft 102.

The towed array deployment system 100 also includes a fluid injection system disposed between the two open ends to introduce fluid into an interior of the tube 116. The fluid injection system is preferably located below the waterline 104.

In one embodiment as illustrated in FIG. 2, the fluid injection system includes at least one valve 204. Suitable valves include, but are not limited to gate valves and ball valves, pneumatic valves, control valves, check valves and solenoid valves and combinations thereof. The valve 204 is attached to or disposed on the tube 116, and, when in an open position, permits passage of the fluid (in direction "A") into the interior of the tube. The motion of the watercraft 102 (in direction "B") is used to propel the fluid through the valve 204 and into and through the interior of the tube 116 to one of the open ends of the tube. This motion carries the towed array 110 out of the open end 308 of the tube 116. In order to facilitate entry of the fluid through the valve 204, the valve is located adjacent the bow 120 of the watercraft 202. Preferably, the valve 204 is not located at the forward most position of the tube 116, but is located along the length of the tube back slightly from the bow 120 of the watercraft 102 toward the end of the tube through which the towed array 110 is deployed. This alignment encourages the injected fluid to flow through the interior of the tube 116 in the desired direction.

In one embodiment as illustrated in FIG. 3, the fluid injection system includes a pump 302, preferably disposed below the waterline 104 of the watercraft 102. Suitable pumps are known and available to those ordinarily skilled in the art. As would be understood by one of ordinary skill in the art, the pump 302 includes an intake and a discharge. In accordance with the present invention, the intake is in communication with a fluid and the discharge line is in communication with the interior of the tube 116.

In another embodiment, the discharge line of the pump 302 is in fluid communication with the interior of the tube 116 adjacent a first end 306 of the tube. Therefore, the pump 302 propels fluid substantially along the length of the tube 116.

In one embodiment, a valve 304 is provided between the discharge line of the pump 302 and the interior of the tube 116. Although illustrated as either a valve or a pump, the fluid injection system could include both the valve 304 and the pump 302 to handle deployment of the towed array 110.

The towed array deployment system 100 also includes a winch 108 attached to the watercraft 102. Although the winch 108 could also be located below the waterline 104, preferably, the winch is located on the deck 150 of the watercraft. Suitable winches are known to those skilled in the art and are commercially-available.

The winch 108 is disposed adjacent the first one 306 of the two open ends of the tube 116. In one embodiment, the first end is located on the through-hull portion 151 of the tube. In addition to the winch 108, one or more pulleys or sheaves may be necessary to help guide the towed array and towed array cable 112 between the winch and the open end of the tube.

Before deployment, the towed array 110 is stored on the winch 108 and extends from the winch through the first open end and at least partially through the interior of the tube 116. A tow cable can also be provided between the end of the towed array 110 and the winch 108. The electronics for the towed array 110 are routed through the towed array and tow cable and through the winch into the signal processing system aboard the watercraft 102, as is currently understood by one skilled in the art.

The towed array 110 is deployed from the winch 108, along the interior of the tube 116 and out a second one 308 of the two open ends. The fluid introduced to the interior by the fluid injection system is used to draw the towed array 110 through the interior of the tube 116. Therefore, in a stored position, a suitable length of the towed array 110 is disposed between the fluid injection system and the second end of the tube. After deployment is complete, the winch 108 is used to retrieve the towed array 110 and to return the towed system to a stowed position.

In using a towed array deployment system 100 to deploy the towed array 110 from the watercraft 102, fluid is introduced into the interior of the tube 116 that is disposed on the watercraft below the waterline 104. A portion of a towed array 110 is positioned in the interior of the tube between the fluid injection point and the discharge end of the tube. The fluid introduced into the interior of the tube 116 draws the towed array through the interior of the tube and out through one of two open ends of the tube that is disposed adjacent a stern 118 of the watercraft 102. In one embodiment, a valve 204 attached to the tube to permit passage of the fluid into the interior is opened, and the motion of the watercraft 102 is used to propel the fluid through the valve and along the interior of the tube. Alternatively, a pump 302 attached to the tube 116 is used to propel the fluid into and along the interior of the tube.

The towed array 110 is stored on a winch 108 disposed on the watercraft 102 and is fed from the winch through another of the two open ends of the tube opposite the discharge end of the tube and into the interior. Drawing the towed array 110 through the interior of the tube 116 deploys the towed array from the winch 108.

An advantage of the towed array deployment system and method of the present invention is the provision of a simple method of deploying a flexible line array from a small surface watercraft without having to stow the entire array on a winch.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A system for towed array deployment, said system comprising:
   a surface watercraft capable of having a discernible waterline;
   a tube attached to the watercraft with the tube positioned below the waterline, said tube comprising two open ends;
   a fluid injection system fluidly connected to said tube between the two open ends with said fluid injection system capable of introducing fluid into an interior of said tube;
   a winch attached to said surface watercraft with said winch disposed adjacent a first one of the two open ends of said tube; and
   a tow cable with towed array stowable on said winch and extending from said winch through the first open end and at least partially through the interior of said tube;
   wherein said towed array is deployable from said winch, along the interior of said tube and out a second one of the two open ends by the fluid introduced into the interior by said fluid injection system.

2. The system of claim 1, wherein said surface watercraft comprises an overall length of less than 12 meters.

3. The system of claim 1, wherein said surface watercraft comprises an overall length in the range of 7 meters to 11 meters.

4. The system of claim 1, wherein said surface watercraft is an unmanned surface vehicle.

5. The system of claim 1, wherein said tube is a non-rectilinear shape.

6. The system of claim 5, wherein both of the open ends of said tube are disposed adjacent a stern of said surface vehicle.

7. The system of claim 5, wherein both of the open ends are disposed aft of said fluid injection system.

8. The system of claim 1, wherein said fluid injection system comprises a pump with an intake in communication with a fluid and a discharge line in fluid communication with the interior of said tube.

9. The system of claim 8, wherein the discharge line of the pump is in fluid communication with the interior of the tube adjacent to the first end of said tube.

10. The system of claim 1, wherein the fluid injection system comprises at least one valve that when in an open position permits passage of a fluid into the interior of said tube.

11. The system of claim 10, wherein said valve is disposed adjacent a bow of said surface watercraft.

12. The system of claim 1, wherein:
   said tube comprises a U-shape positioned with the ends of the U-shape corresponding to the open ends of said tube and disposed adjacent to a stern of said surface watercraft; and
   said fluid injection system comprises a valve permitting passage of a fluid into the interior of said tube, said valve disposed along a curved bottom of the U-shape and adjacent a bow of said surface watercraft.

13. A method for deploying a towed array from a surface watercraft, the method comprising the steps of:
   introducing fluid into an interior of a tube disposed on the watercraft below a waterline of the watercraft, a portion of a towed array disposed in the interior of the tube; and
   using the introduced fluid to draw the towed array through the interior of the tube and out through one of two open ends of the tube that is disposed adjacent to a stern of the watercraft.

14. The method of claim 13, wherein said step of introducing the fluid further comprises opening a valve fluidly connected to the tube to permit passage of the fluid into the interior and using the motion of the watercraft to propel the fluid through the valve and along the interior of the tube.

15. The method of claim 13, wherein said step of introducing the fluid further comprises using a pump attached to the tube to propel the fluid into and along the interior of the tube.

16. The method of claim 13, further comprising a step of storing the towed array on a winch disposed on the watercraft and feeding the towed array from the winch through another of the two open ends of the tube and into the interior wherein drawing the towed array through the interior of the tube deploys the towed array from the winch.

* * * * *